United States Patent [19]

Moosberg

[11] Patent Number: 5,799,891
[45] Date of Patent: Sep. 1, 1998

[54] FISHING REEL OF THE MULTIPLIER TYPE

[75] Inventor: Börje Moosberg, Mörrum, Sweden

[73] Assignee: Berkley Inc., Spirit Lake, Iowa

[21] Appl. No.: 827,101

[22] Filed: Mar. 17, 1997

[51] Int. Cl.[6] ............................................. A01K 89/015
[52] U.S. Cl. ............................................. 242/261
[58] Field of Search ............................. 242/261, 260, 242/259

[56] References Cited

U.S. PATENT DOCUMENTS

| | | | |
|---|---|---|---|
| 4,564,158 | 1/1986 | Moosberg et al. | |
| 5,158,245 | 10/1992 | Johansson | |
| 5,246,187 | 9/1993 | Noda | 242/261 |
| 5,333,812 | 8/1994 | Sato | 242/241 |
| 5,601,246 | 2/1997 | Takahashi | 242/261 |
| 5,607,117 | 3/1997 | Svensson | 242/261 |

*Primary Examiner*—Katherine Matecki
*Attorney, Agent, or Firm*—Browdy and Neimark

[57] ABSTRACT

A fishing reel of the multiplier type comprises a rotatable line spool which is mounted on a shaft. A clutch member having a gear is mounted on the shaft. The gear meshes with a driving gear which is rotatable by means of a handle. The clutch member is displaceable along the shaft between an engaging position, in which it is connected to the line spool for rotation thereof, and a disengaging position, in which it is disconnected from the line spool. The clutch member is displaceable from its first to its second position by means of a trigger which actuates a clutch mechanism for displacement of the clutch member. The clutch mechanism comprises a disk which is turnable by the trigger and has ramp elements for cooperation with ramp elements on a yoke supporting the clutch member. The disk cooperates with a spring assembly having a cam curve with a first cam surface, a second cam surface and an intermediate crest. The cam curve is resiliently pressed against a guide pin arranged on the disk for pressing the disk to one or the other of two end turning positions, in dependence on which of the cam surfaces engages the guide pin.

6 Claims, 5 Drawing Sheets

FISHING REEL OF THE MULTIPLIER TYPE

FIELD OF THE INVENTION

The present invention relates to a fishing reel of the multiplier type.

Known fishing reels of this type generally have a frame with two side plates, a line spool shaft extending through the frame, and a rotatable line spool mounted on the line spool shaft. A mounting plate arranged on the frame inwardly of one of the side plates thereof has a spindle parallel to the line spool shaft and extending through said one side plate, and a hole through which the line spool shaft extends. A handle is mounted on the spindle outside said one side plate. A driving gear and a toothed wheel are mounted on the spindle and arranged to be rotated by means of the handle. A clutch means is mounted on the line spool shaft and has a gear portion meshing with the driving gear to be rotated thereby. The clutch means is displaceable along the line spool shaft between an engaging position, in which it engages the line spool for rotation thereof, and a disengaging position, in which it is disengaged from the line spool. A clutch mechanism operable by means of a manually adjustable trigger is mounted on the mounting plate for shifting the clutch means between its two positions.

When a cast is to be made, the trigger is actuated for shifting the clutch means to its disengaging position. When the clutch means is in its disengaging position, the line spool can rotate freely. The clutch mechanism is so designed that it will return the clutch means to its engaging position when the angler starts turning the handle in the direction of line retrieve, i.e. the direction in which that part of a line, fixed to the line spool, which has been paid out during the cast is again wound onto the spool.

Fishing reels of this type are disclosed in, for instance, U.S. Pat. Nos. 4,564,158 and 5,158,245 as well as U.S. patent application Ser. No. 439,896 filed on May 12, 1995, now U.S. Pat. No. 5,607,117.

SUMMARY OF THE INVENTION

The object of the present invention is to provide a fishing reel having a comparatively simple clutch mechanism which is easy to mount and which is reliable with respect to function.

According to the present invention, this object is achieved by means of a fishing reel of the multiplier type comprising a frame;

two outer side plates mounted on said frame;

a line spool shaft mounted in said frame;

a rotatable line spool mounted on said shaft;

a mounting plate arranged in the frame inwardly of one of said side plates and supporting a spindle parallel to the line spool shaft and extending through said one side plate, and having a hole through which the line spool shaft extends, two first mounting pins substantially diametrically opposed with respect to said hole, and a second mounting pin, said first and second mounting pins being parallel to the line spool shaft and projecting towards said one side plate;

a handle mounted on said spindle outwardly of said one side plate;

a driving gear and a toothed wheel which are mounted on said spindle and arranged to be rotated by means of said handle;

a clutch means which is mounted on said line spool shaft and has a gear portion meshing with the driving gear to be rotated thereby, and which is displaceable along the line spool shaft between an engaging position, in which the clutch means is connected to said line spool for rotation thereof, and a disengaging position, in which the clutch means is disconnected from said line spool;

a disk mounted on the mounting plate and turnable about the line spool shaft between a first position and a second position and having a ramp means formed thereon and a guide pin;

a yoke, in which the clutch means is rotatably mounted and which is displaceably mounted on said two first mounting pins for shifting said clutch means between its two positions;

a resilient means adapted to press said yoke in such a direction that said clutch means is urged towards its engaging position;

said yoke having a ramp means which is adapted to cooperate with the ramp means on said disk so as to displace, on turning thereof from the first to the second position, said yoke in such a direction that the clutch means is moved to its disengaging position;

a trigger which is mounted on said frame and is connected to said disk for turning thereof from its first position to its second position;

a spring assembly consisting of a spring holder which is pivotally mounted on said second mounting pin and has a cam curve, and a spring which is fixed between the spring holder and the mounting plate in such a manner that by spring action it presses the cam curve of the spring holder into engagement with the guide pin on the disk;

the cam curve having a first cam surface which engages the guide pin when the disk is in its first position, a second cam surface which engages the guide pin when the disk is in its second position, and a crest which is positioned between the cam surfaces and towards which the two cam surfaces rise in such manner that the spring holder, when the disk is turned from its first and second position in the direction of its second and first position, respectively, is pivoted in such a direction that the spring is tensioned further so as to turn, when the guide pin has passed the crest of the cam curve, via the spring holder, the second and first cam surface thereof and the guide pin, the disk further to its second and first position, respectively; and an engaging means which is movable between a neutral position and an engaging position and is connected to the disk so as to take its neutral position, when the disk is in its first position, and, when the disk is in its second position, take its engaging position, in which the toothed wheel during turning of the handle engages the engaging means so as to turn, via the same, the disk so far in the direction of its first position that the guide pin passes the crest of the cam curve.

BRIEF DESCRIPTION OF THE DRAWINGS

The invention will now be described in more detail with reference to the accompanying drawings.

DESCRIPTION OF THE PREFERRED EMBODIMENT

Figure 1:
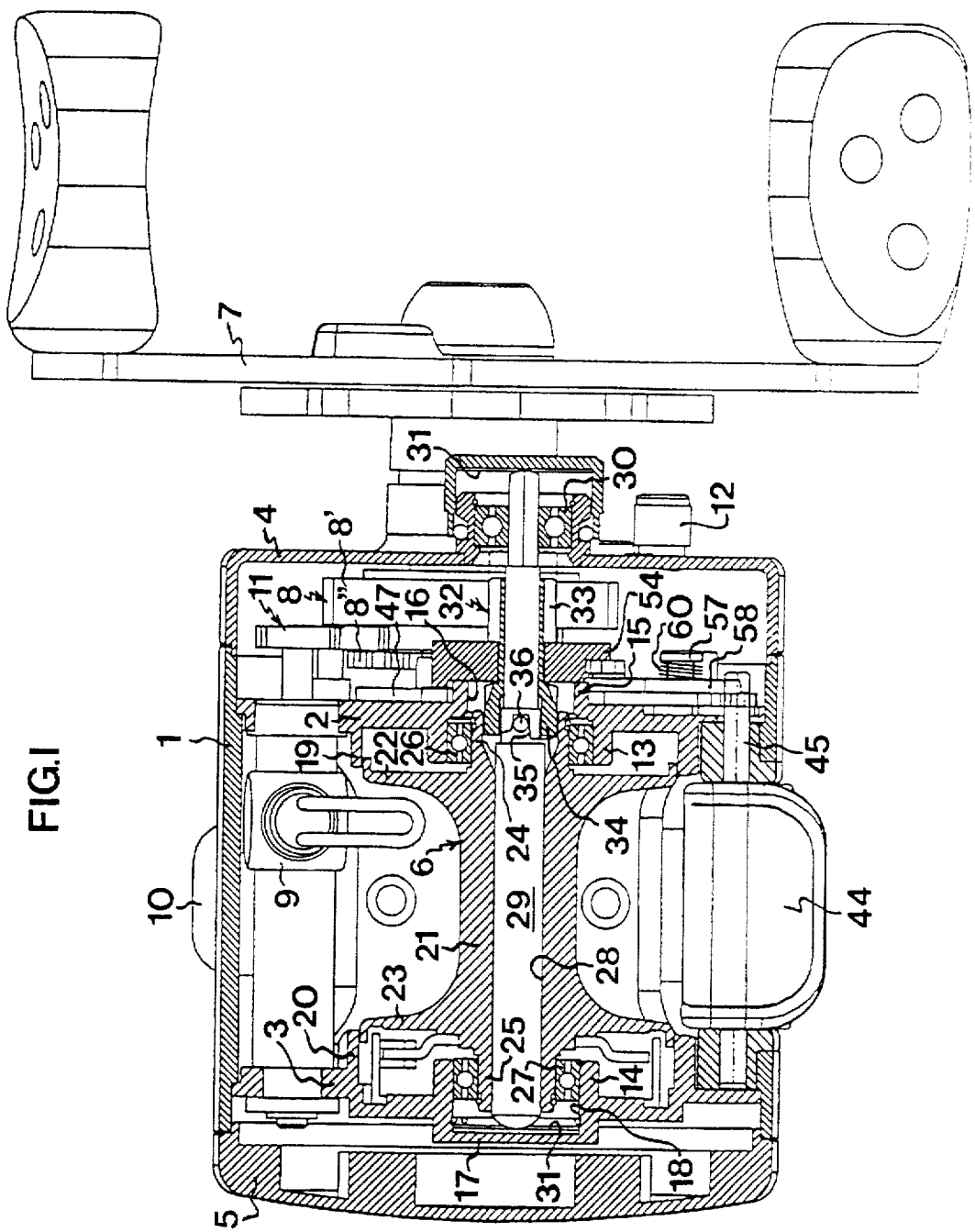
FIG. 1 is a longitudinal section of a fishing reel according to the present invention.

The fishing reel illustrated in FIG. 1 is of the multiplier type and has a substantially circular-cylindrical frame 1. The fishing reel further comprises two detachable inner side plates 2 and 3 and two detachable outer side plates 4 and 5. The fishing reel also has a line spool 6 for receiving a fishing line (not shown) and mounted in the frame 1 between the two inner side plates 2 and 3, a handle 7 with an associated transmission mechanism 8 for rotation of the line spool 6, a level-wind mechanism 9 mounted in the frame 1 between the two inner side plates 2 and 3, and a foot 10 which is riveted to the frame 1 and by means of which the fishing reel can be mounted on a fishing rod (not shown). The right-hand inner side plate 2 supports the handle 7 and the transmission mechanism 8.

The handle 7 with the associated transmission mechanism 8 and the level-wind mechanism 9 with the associated transmission mechanism 11 are of conventional type and therefore will not be described in more detail here.

The inner side plates 2 and 3 and the outer side plates 4 and 5, all having circular shape, are fixed to the frame 1 by means of screws 12.

Each of the two inner side plates 2 and 3 has an axially inwardly directed sleeve means 13 and 14, respectively. The right-hand inner side plate 2, which as will be described in more detail below constitutes a mounting plate, also comprises an axially outwardly directed sleeve means 15 which has a smaller inner diameter than the sleeve means 13 and, together with this, defines a circular through opening 16 in the right-hand inner side plate 2. The left-hand inner side plate 3 has an external circular portion 17, which closes the sleeve means 14 and, together with this, defines a circular chamber 18.

The line spool 6 has a cylindrical spool body 21, which is provided at each end with a circumferential, substantially radial end flange 22, 23. The spool body 21 of the line spool 6 has at each end an extension coaxial with the line spool and forming a sleeve means 24, 25 protruding axially from the line spool 6. The outer diameter of the sleeve means 24, 25 is considerably smaller than the inner diameter of the sleeve means 13 and 14, respectively. The sleeve means 24 and 25 extend into the sleeve means 13 and 14, respectively, and are rotatably mounted therein by means of a ball bearing 26 and 27, respectively. The line spool 6 has an axial center bore 28, which extends through the spool body 21 and the two sleeve means 24 and 25. The center hole 28 has a greater diameter in the sleeve means 24 than in the spool body 21 and the sleeve means 25, where it has the same diameter.

The shaft 29 of the line spool 6 is inserted with a close fit in the center bore 28 of the line spool 6. The line spool 6 thus is non-rotatably connected to the shaft 29. The shaft 29 is in a disengageable engagement, which will be described in more detail below, with the transmission mechanism 8 for rotating the line spool 6 when the handle 7 is turned for winding the fishing line onto the line spool 6. The shaft 29 extends through the line spool 6 and is at its right end rotatably mounted in the right-hand outer side plate 4 by means of a ball bearing 30. The shaft 29 extends at its left end into the chamber 18. The shaft 29 bears, at its outer ends, on resilient friction elements 31 for adjustable braking of the shaft 29 and hence of the line spool 6.

A sleeve-shaped clutch means 32, which is operable by means of a clutch mechanism as described in more detail below, is mounted on the shaft 29. The clutch means 32 has at its right end an external gear 33 which is connected to and driven by the handle 7 via a driving gear 8' which together with a toothed wheel 8", whose function will be described in more detail below, is included in a transmission mechanism 8. The clutch means 32 has at its left end a socket portion 34, which has a diametrical groove 35 in its terminal edge surface. The shaft 29 has, on an axial level with the sleeve means 24 of the line spool 6, a pin 36 extending diametrically through the shaft. The clutch means 32 is displaceable back and forth along the shaft 29 between an engaging position, which is indicated by full lines in FIG. 1 and in which the pin 36 is received in the groove 35 and the clutch means 32 thus is drivingly engaged with the shaft 29 for rotating the line spool 6 when the handle 7 is rotated for retrieving the fishing line, and a disengaging position, which is positioned somewhat to the right of the engaging position and indicated by dashed lines in FIG. 1 and in which the groove 35 does not receive the pin 36.

The right-hand inner side plate 2 has a through hole 37, in which the transmission mechanism 8 is rotatably mounted by means of a ball bearing (not shown). The side plate 2 has in its outwardly directed surface a groove 38 which has the form of a circular arc and which is coaxial with the axis of the frame 1. An operating slide 39, which has the same form of a circular arc as the groove 38 but a shorter length of arc than the groove, is arranged in the groove to be moved back and forth therein. The thickness of the slide 39 equals the depth of the groove 38. The groove 38 has over part of its extent a widened portion 40 positioned radially outside the groove. An elongate hole 41 extends through the side plate 2 in the widened portion 40. The slide 39 has a projection 42, which projects over the hole 41 in the widened portion 40. The slide 39 has adjacent to its one end an axially outwardly directed lug 43.

Figure 2:
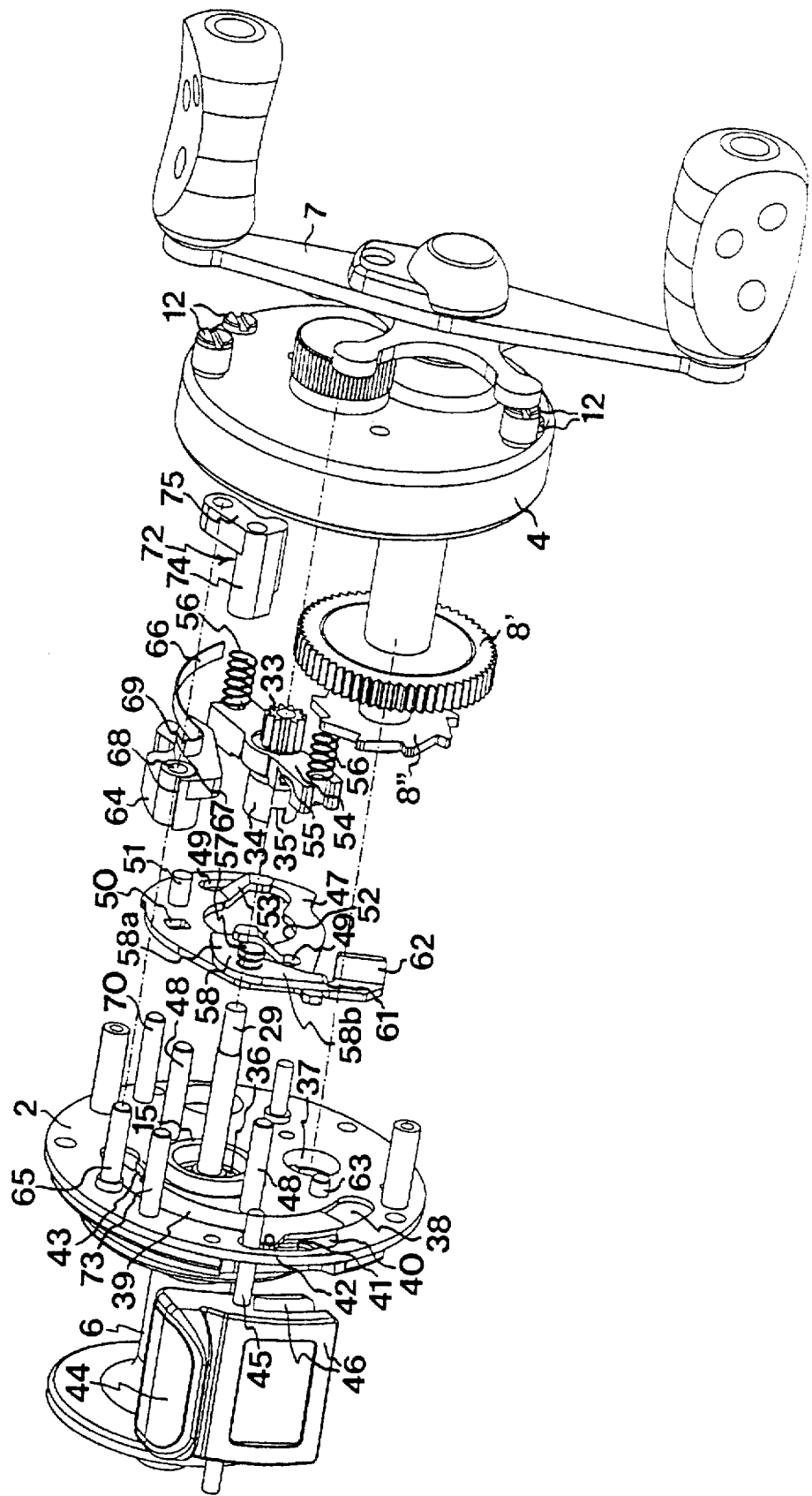
FIG. 2 is an exploded view showing the components of a clutch mechanism in the fishing reel illustrated in FIG. 1.
Figure 4:
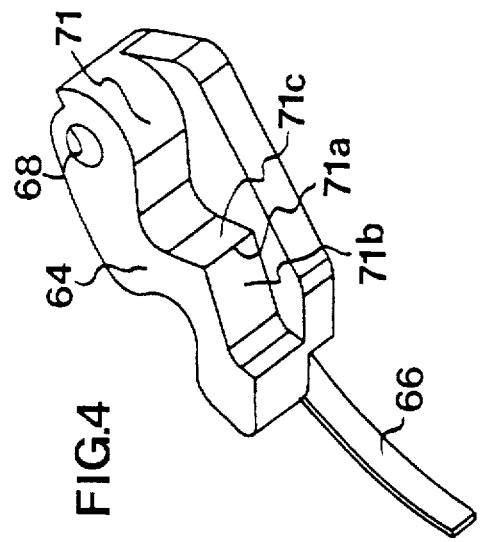
FIG. 4 is a perspective view and shows a spring assembly included the clutch mechanism.
Figure 3:
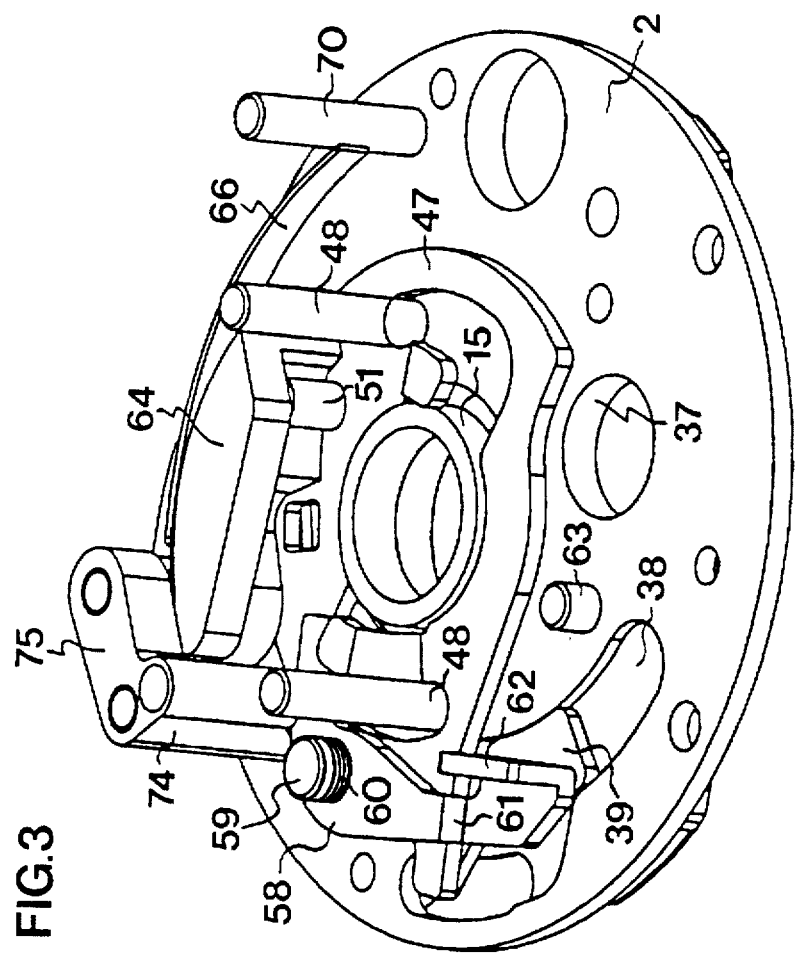
FIG. 3 is a perspective view and shows the clutch mechanism mounted on a mounting plate.

The slide 39 is displaceable by means of a trigger 44 operable with the thumb. An operating pin 45 parallel to the shaft 29 extends through the trigger 44. The pin 45 extends at its right end through the hole 41 in the side plate 2 and extends at its left end through a corresponding hole (not shown) in the left-hand inner side plate 3. The trigger 44 has two legs 46 which are positioned on either side of an axially directed rod (not shown) in the frame 1, said rod constituting a guide for the t rigger 44. The trigger 44 is displaceable between an upper starting position (FIG. 2), in which the pin 45 is located at the upper end of the elongate hole 41, and a pressed-down position, in which the pin 45 is located at the lower end of the hole 41. "Upper" and "lower" here relate to the position of the components which is shown in FIG. 2 and which besides corresponds to the position of use of the fishing reel when fishing. The pin 45 cooperates with the projection 42 of the slide 39 and accomplishes, while the trigger 44 is being pressed down from the starting position, a downward displacement of the slide 39 in the groove 38 from its starting position shown in FIG. 2.

An annular disk 47, which like the trigger 44 with the pin 45 and the slide 39 is included in the clutch mechanism, is turnably mounted on the external sleeve means 15 of the right-hand inner side plate 2. The side plate 2 has two axially directed mounting pins 48 which are diametrically opposed with respect to the sleeve means 15 and which extend each through a through hole 49 having the form of a circular arc and formed in the disk 47. The disk 47 is turnable about the sleeve means 15 between two end positions. In one end position, in which the disk 47 is located when the slide 39 is in its starting position, the pins 48 engage one end wall of the respective holes 49. The other end position of the disk 47 is defined in a manner that will be described in more detail below. The disk 47 has a through hole 50, in which the lug 43 formed on the slide 39 engages so as to turn the disk 47 about the sleeve means 15 while the slide 39 is being displaced in the groove 38. The disk 47 has an axially outwardly directed guide pin 51 which is positioned between the hole 50 and one of the holes 49. The annular disk 47 further has two ramp elements 53 which are diametrically opposed with respect to the center hole 52 of the disk and have an outwardly directed ramp surface.

In the clutch mechanism also a yoke 54 is included, which is snapped over a waist portion formed on the clutch means 32, between the gear 33 and the socket portion 34. The clutch means 32 is rotatably mounted in the yoke 54. The yoke 54 is non-rotatably but axially displaceably mounted on the two guide pins 48 to displace the clutch means 32 along the shaft 29 between the engaging position and the disengaging position. The yoke 54 has two ramp surfaces 55 which are diametrically opposed with respect to the shaft 29 and which face the right-hand inner side plate 2. The yoke 54 is pressed in the direction of the disk 47 by means of two springs 56 arranged between the yoke 54 and the right-hand outer side plate 4, such that the ramp surfaces 55 of the yoke engage the ramp surfaces of the ramp elements 53 for cooperation therewith. When the disk 47 is turned about the sleeve means 15 from said one end position, in which the disk is located when the slide 39 is in its starting position, to said other end position, the ramp surfaces of the ramp elements 53 and the ramp surfaces 55 of the yoke 54 cooperate with each other such that the yoke 54 is moved away from the right-hand inner side disk 2 to displace the clutch means 32 from the engaging position to the disengaging position.

The disk 47 has an axially outwardly directed pivot pin 57, on which an elbow lever 58 is pivotally mounted. The pin 57 has an outer head 59, and a spring 60 is arranged on the pin between the head and the lever 58 for pressing this against the disk 47. The elbow lever 58 has two arms 58a and 58b which extend essentially perpendicular to each other and of which the arm 58a is short and the arm 58b is long. The long arm 58b has a bend 61 which is so designed that its outer portion is positioned in essentially the same plane as the disk 47. The outer portion has an axially outwardly projecting lug 62 which is formed by bending.

When the disk 47 is turned from said one end position, the short arm 58a of the elbow lever 58 will come into engagement with one mounting pin 48, such that, during continued turning of the disk 47, the elbow lever is pivoted about the pin 57 until the lug 62 comes into engagement with an axially outwardly directed stop pin 63 on the right-hand inner side disk 2. When this takes place, the disk 47 cannot be turned any longer. The disk 47 is then located in said second end position.

A spring holder 64 included in the clutch mechanism is pivotally mounted on a mounting pin 65 which projects axially outwards from the right-hand inner side plate 2. The spring holder 64 supports a leaf spring 66, which is pressed into a slit 67 formed in the spring holder 64 in the vicinity of its hole 68 intended for the pin 65. The leaf spring 66 extends along an arcuate surface 69 which is formed at the outwardly directed side of the spring holder 64 and against which the leaf spring 66 abuts more or less in dependence on the pivoting position of the spring holder 64. Thus, the leaf spring 66 extends along at least a portion of the arcuate surface 69 and is at its free end tensioned to arc shape by means of a pin 70 projecting axially outwards from the right-hand inner side plate 2. The leaf spring 66 strives to pivot the spring holder 64 clockwise about the pin 65.

The spring holder 64 has at its inwardly directed side a cam curve 71, which by the action of the leaf spring 66 on the spring holder 64 is pressed into engagement with the guide pin 51 on the disk 47. As is best shown in FIGS. 5–10, the cam curve 71 has a crest 71a and two cam surfaces 71b and 71c positioned on either side of the crest. The one cam surface 71b, which is pressed against the guide pin 51 when the disk 47 is located in its said one end position (see FIG. 5) and the clutch means 32 thus is in the engaging position, has a slight slope, while the other cam surface 71c, which is pressed against the guide pin 51 when the disk 47 is in its said other end position (see FIG. 9) and the clutch means 32 thus is in its disengaging position, has a steep slope.

A mounting member 72 included in the clutch mechanism is mounted on a mounting pin 73 projecting axially outwards from the right-hand inner side plate 2, and the mounting pin 65. The mounting member 72 has a shank portion 74, which is slipped onto the pin 73, and an arm 75 projecting from the shank portion and slipped onto the pin 65 and holding the spring holder 64 in place thereon.

The function of the clutch mechanism will now be described in more detail with special reference to FIGS. 5–10.

Figure 5:
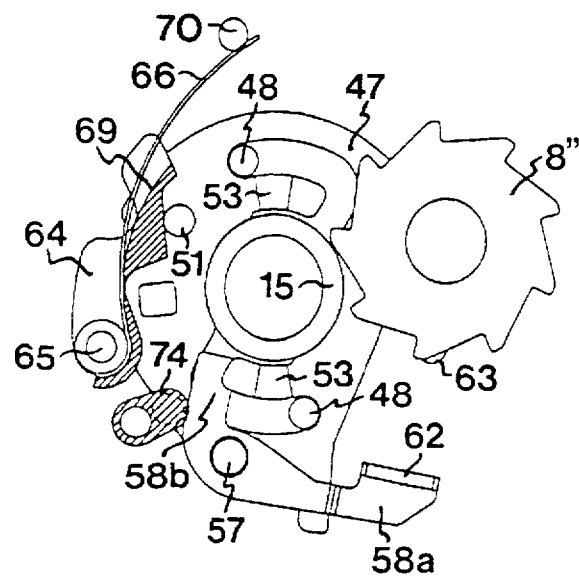
FIGS. 5–10 are top plan views and illustrate the clutch mechanism in various positions.
Figure 6:
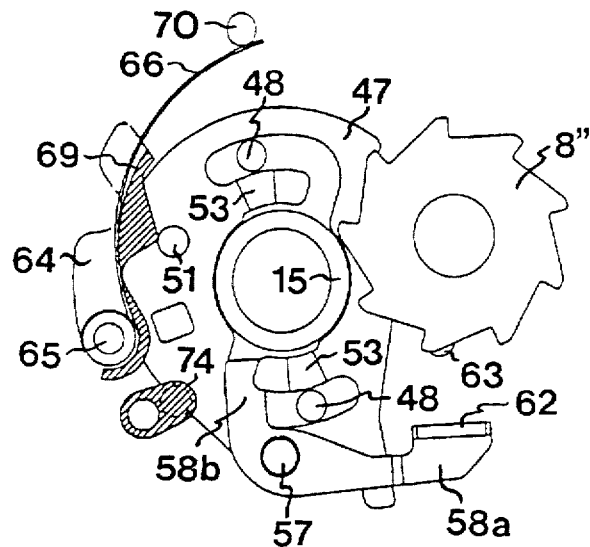
Figure 7:
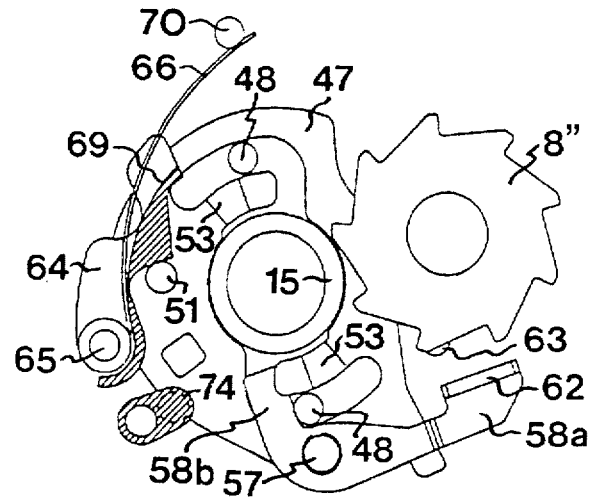
Figure 8:
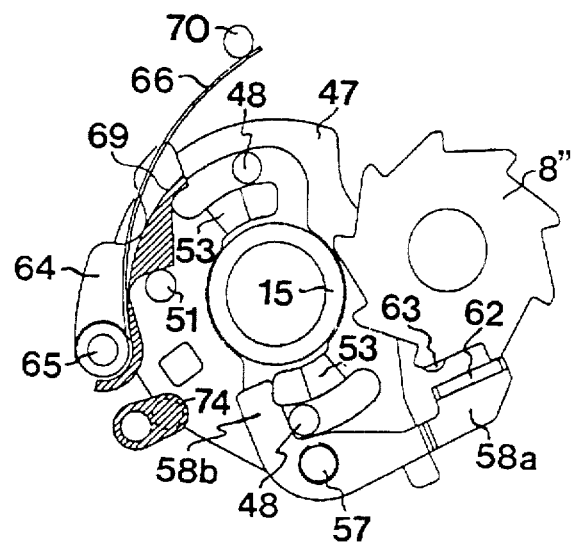

FIG. 5 shows the clutch mechanism in its starting position, i.e. the position in which its yoke 54 holds the clutch means 32 in the engaging position. In this starting position, the trigger 44 thus is in its starting position, the slide 39 is in its starting position, the disk 47 is in its said one end position, and the elbow lever 58 is in a swung-out position, in which the long lever arm 58b abuts against the circumferential wall of the cup-shaped, right-hand outer side plate 4. The clutch mechanism is retained in its starting position by the leaf spring 66, which, via the cam surface 71b, pressed against the guide pin 51 of the disk 47, of the spring holder 64, holds the disk 47 in said one end position.

Figure 9:
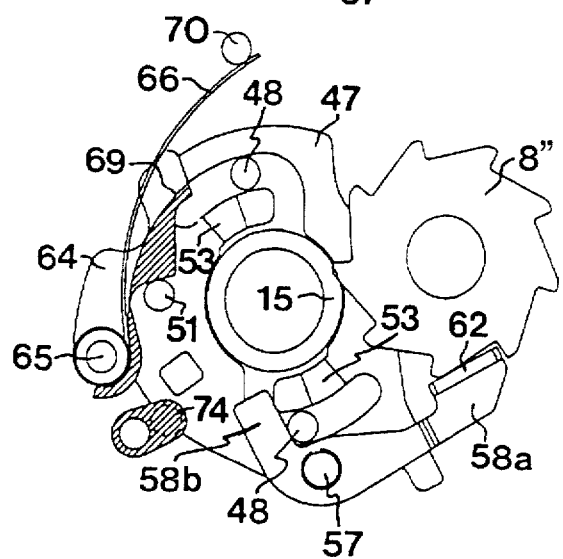
Figure 10:
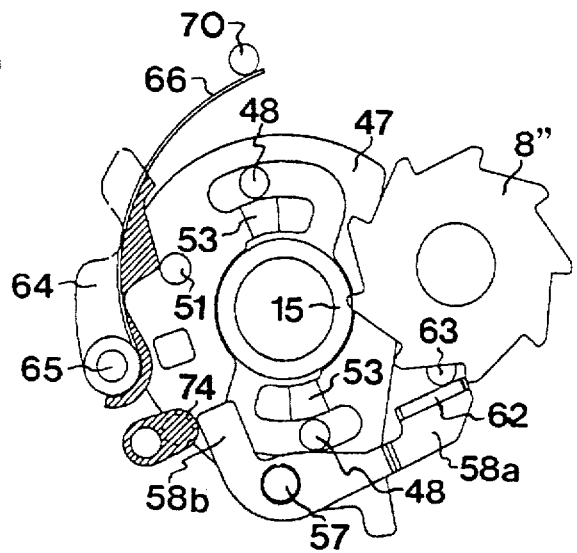

When the trigger 44 is pressed down from its starting position, it moves the slide 39 from its starting position such that the disk 47 is turned from its said one end position. The guide pin 51 is displaced along the cam surface 71b in the direction of the crest 71a of the cam curve 71 and presses the spring holder 64 outwards, such that the leaf spring 66 is tensioned further and abuts against a larger part of the arcuate surface 69. When the guide pin 51 passes the crest 71a of the cam surface 71 (FIG. 6), the leaf spring 66 performs, via the spring holder 64, a rapid continued turning of the disk 47 by the cam surface 71c of the cam curve 71 being pressed against the guide pin 51. During this rapid turning of the disk 47, the short arm 58a of the elbow lever 58 comes into engagement, as described above, with one mounting pin 48 (FIG. 7), such that the lever 58 is pivoted inwards until the lug 62 comes into engagement with the stop pin 63 on the right-hand inner side plate 2. The transmission mechanism 8, which is turnable by the handle 7, can take such a turning position that the lug 62 of the lever 58 hits a tooth of the toothed wheel 8" before it reaches the stop pin 63 (see FIG. 8). Even if the turning of the disk 47 is stopped in this manner a short distance from its said other end position, it has been turned sufficiently to have displaced, via the yoke 54, the clutch means 32 to the disengaging position. When slightly turning the handle 7 and thus the toothed wheel 8" in the direction of line retrieve A, i.e. the direction in which that part of a line, fixed to the line spool 6, which has been paid out during the cast is again wound onto the spool, the lug 62 is inserted, by the turning action of the leaf spring 66 on the disk 47, in a space width of the toothed wheel 8" and comes into engagement with the stop pin 63 (FIG. 9).

When turning the handle 7 and thus the toothed wheel 8" in the direction of line retrieve A, the toothed wheel first presses, by engaging the lug 62, the elbow lever 58 back and effects a turning of the disk 47 against the action of the leaf spring 66. During this turning, the guide pin 51 is displaced along the cam surface 71c of the cam curve 71 in the direction of its crest 71a and presses the spring holder 64 outwards such that the leaf spring 66 is tensioned further. When the guide pin 51 passes the crest 71a of the cam curve 71 (FIG. 10), the leaf spring 66 performs, via the spring holder 64, a rapid continued turning of the disk 47 to its said one end position by the cam surface 71b of the cam curve 71 being pressed against the guide pin 51. During this turning of the disk 47, the short arm 58a of the elbow lever 58 comes into engagement with the shank portion 74 of the mounting member 72 (see FIG. 10), such that the lever 58 is pivoted outwards to its swung-out position. Consequently, the clutch mechanism has been returned to its starting position (FIG. 5).

What I claim and desire to secure by Letters Patent is:

1. A fishing reel of the multiplier type, comprising a frame;

two outer side plates mounted on said frame;

a line spool shaft mounted in said frame;

a rotatable line spool mounted on said shaft;

a mounting plate arranged in the frame inwardly of one of said side plates and supporting a spindle parallel to the line spool shaft and extending through said one side plate, and having a hole through which the line spool shaft extends, two first mounting pins substantially diametrically opposed with respect to said hole, and a second mounting pin, said first and second mounting pins being parallel to the line spool shaft and projecting towards said one side plate;

a handle mounted on said spindle outwardly of said one side plate;

a driving gear and a toothed wheel which are mounted on said spindle and arranged to be rotated by means of said handle;

a clutch means which is mounted on said line spool shaft and has a gear portion meshing with the driving gear to be rotated thereby, and which is displaceable along the line spool shaft between an engaging position, in which the clutch means is connected to said line spool for rotation thereof, and a disengaging position, in which the clutch means is disconnected from said line spool;

a disk mounted on the mounting plate and turnable about the line spool shaft between a first position and a second position and having a ramp means formed thereon and a guide pin;

a yoke, in which the clutch means is rotatably mounted and which is displaceably mounted on said two first mounting pins for shifting said clutch means between its two positions;

a resilient means adapted to press said yoke in such a direction that said clutch means is urged towards its engaging position;

said yoke having a ramp means which is adapted to cooperate with the ramp means on said disk so as to displace, on turning thereof from the first to the second position, said yoke in such a direction that the clutch means is moved to its disengaging position;

a trigger which is mounted on said frame and is connected to said disk for turning thereof from its first position to its second position;

a spring assembly consisting of a spring holder which is pivotally mounted on said second mounting pin and has a cam curve, and a spring which is fixed between the spring holder and the mounting plate in such a manner that by spring action it presses the cam curve of the spring holder into engagement with the guide pin on the disk;

the cam curve having a first cam surface which engages the guide pin when the disk is in its first position, a second cam surface which engages the guide pin when the disk is in its second position, and a crest which is positioned between the cam surfaces and towards which the two cam surfaces rise in such manner that the spring holder, when the disk is turned from its first and second position in the direction of its second and first position, respectively, is pivoted in such a direction that the spring is tensioned further so as to turn, when the guide pin has passed the crest of the cam curve, via the spring holder, the second and first cam surface thereof and the guide pin, the disk further to its second and first position, respectively; and an engaging means which is movable between a neutral position and an engaging position and is connected to the disk so as to take its neutral position, when the disk is in its first position, and, when the disk is in its second position, take its engaging position, in which the toothed wheel during turning of the handle engages the engaging means so as to turn, via the same, the disk so far in the direction of its first position that the guide pin passes the crest of the cam curve.

2. Fishing reel as claimed in claim 1, wherein the second cam surface rises more steeply towards the crest of the cam curve than the first cam surface.

3. Fishing reel as claimed in claim 1, wherein the engaging means is an elbow lever which is pivotally mounted on a pivot pin extending in parallel with the line spool shaft and fitted on the disk to be pivoted between its neutral position and its engaging position and which has a first arm and a second arm having a lug which is arranged to engage with the toothed wheel when the elbow lever takes its engaging position.

4. Fishing reel as claimed in claim 3, wherein the first arm of said elbow lever is arranged such that, during turning of the disk from its first to its second position, it comes into engagement with one of said first mounting pins and pivots said elbow lever from its neutral position to its engaging position.

5. Fishing reel as claimed in claim 4, wherein an abutment is mounted on the mounting plate in such a position that the first arm of said elbow lever, during turning of the disk from its second position to its first position, comes into engagement with the abutment and pivots said elbow lever from its engaging position to its neutral position.

6. Fishing reel as claimed in claim 1, wherein the spring is a leaf spring.

* * * * *